United States Patent
Higashino et al.

(10) Patent No.: US 6,882,067 B2
(45) Date of Patent: Apr. 19, 2005

(54) STATOR FOR A DYNAMOELECTRIC MACHINE

(75) Inventors: Kyoko Higashino, Tokyo (JP); Toshiaki Kashihara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/745,968

(22) Filed: Dec. 29, 2003

(65) Prior Publication Data

US 2004/0135440 A1 Jul. 15, 2004

(30) Foreign Application Priority Data

Dec. 27, 2002 (JP) ........................................ 2002-381244

(51) Int. Cl.$^7$ ............................. H02K 5/24; H02K 15/02
(52) U.S. Cl. ............................. 310/51; 310/71; 310/180
(58) Field of Search ................................ 310/51, 67 R, 310/71, 180, 254

(56) References Cited

U.S. PATENT DOCUMENTS

| | | | | |
|---|---|---|---|---|
| 2,316,635 A | * | 4/1943 | Staak ........................... | 310/214 |
| 2,720,600 A | * | 10/1955 | Pollard .......................... | 310/51 |
| 3,260,875 A | * | 7/1966 | Evans ........................... | 310/217 |
| 4,496,870 A | * | 1/1985 | Antonov et al. ............. | 310/260 |
| 5,682,070 A | | 10/1997 | Adachi et al. | |
| 5,949,163 A | * | 9/1999 | Karafillis et al. .............. | 310/51 |
| 6,515,393 B1 | * | 2/2003 | Asao et al. .................. | 310/184 |
| 6,661,146 B1 | * | 12/2003 | Oohashi et al. ............. | 310/180 |
| 6,736,423 B1 | * | 5/2004 | Simonian et al. ........... | 280/731 |
| 6,817,431 B1 | * | 11/2004 | Rasch ......................... | 180/65.2 |

FOREIGN PATENT DOCUMENTS

JP 09-019119 A 1/1997

* cited by examiner

*Primary Examiner*—Burton Mullins
(74) *Attorney, Agent, or Firm*—Sughrue Mion, PLLC (57) ABSTRACT

A stator for a dynamoelectric machine includes an annular stator core in which a large number of slots extending in an axial direction are disposed in a circumferential direction so as to open radially inward; a stator winding having a plurality of winding phase portions installed in the stator core, lead wires of the plurality of winding phase portions being led axially outward within a predetermined circumferential range from an axial end of a first coil end group formed at a first axial end of the stator core; and a first mass adjusting portion disposed at a first end of the stator core, the first mass adjusting portion adjusting a circumferential mass imbalance relative to a central axis of the stator core resulting from a circumferential bias in positions from which the lead wires are led out.

5 Claims, 10 Drawing Sheets

STATOR FOR A DYNAMOELECTRIC MACHINE

BACKGROUND OF THE INVENTION

1. Field of the Invention

The present invention relates to a stator for a dynamoelectric machine such as an automotive alternator, etc., and particularly relates to a stator construction for correcting circumferential mass imbalances caused by lead wires of a stator winding.

2. Description of the Related Art

A conventional stator for an automotive alternator is constituted by: an annular stator core in which slots extending in an axial direction are disposed at a predetermined pitch in a circumferential direction so as to open radially inward; and a stator winding installed in the stator core. The stator winding is constituted by three winding phase portions, the positions at which lead wires of each of the winding phase portions are led out from a rear-end coil end group being distributed within a circumferential range of approximately 120 degrees centered around a central axis of the stator core. Each of the lead wires is led axially outward from an apex portion of the rear-end coil end group and is connected to a rectifier apparatus. Thus, output from the stator winding is three-phase full wave rectified by the rectifier apparatus. (See Patent Literature 1, for example.)

Patent Literature 1: Japanese Patent Laid-Open No. HEI 9-19119 (Gazette: FIG. 1)

In the conventional stator for an automotive alternator, the lead wires of the stator winding are distributed in a state of imbalance relative to the circumferential direction, specifically within a range of approximately 120 degrees in a circumferential direction centered around the central axis of the stator core. The lead wires project axially outward from an axial end of the coil end group and vibrate easily.

Thus, when an automotive alternator mounted with the stator is mounted to an automotive vehicle, the lead wires vibrate when the stator is subjected to vibrations from the engine, etc., thereby subjecting the stator winding to vibration. As a result, one disadvantage has been that the vibration to which the stator is subjected is amplified by the stator winding, giving rise to wire breakages in the stator winding, particularly in the lead wires, thereby leading to defective power generation.

Another disadvantage has been that when the vibration of the stator is amplified, vibration of the alternator case supporting the stator also increases, making the reliability of the alternator poor.

SUMMARY OF THE INVENTION

The present invention aims to solve the above problems and an object of the present invention is to provide a stator for a dynamoelectric machine enabling wire breakages in a stator winding and propagation of vibration to a dynamoelectric machine case to be suppressed by disposing a mass adjusting portion for correcting circumferential mass imbalances resulting from biases in positions from which lead wires of the stator winding are led out on an apex portion of a rear-end coil end group to suppress amplification of vibrations to which the stator is subjected.

With the above object in view, a stator for a dynamoelectric machine of the present invention includes an annular stator core in which a large number of slots extending in an axial direction are disposed in a circumferential direction so as to open radially inward, and a stator winding having a plurality of winding phase portions installed in the stator core. Lead wires of the plurality of winding phase portions are led axially outward within a predetermined circumferential range from an axial end of a first coil end group formed at a first axial end of the stator core. Further, the stator for the dynamoelectric machine includes a first mass adjusting portion disposed at a first end of the stator core, the first mass adjusting portion adjusting a circumferential mass imbalance relative to a central axis of the stator core resulting from a circumferential bias in positions from which the lead wires are led out.

Therefore, a stator for a dynamoelectric machine is obtained enabling wire breakages in the stator winding and propagation of vibration to a dynamoelectric machine case to be suppressed by correcting circumferential mass imbalances resulting from biases in positions from which the lead wires of the stator winding are led out and suppressing amplification of vibrations to which the stator is subjected.

DETAILED DESCRIPTION OF THE PREFERRED EMBODIMENTS

Preferred embodiments of the present invention will now be explained with reference to the drawings.

Embodiment 1

Figure 1:
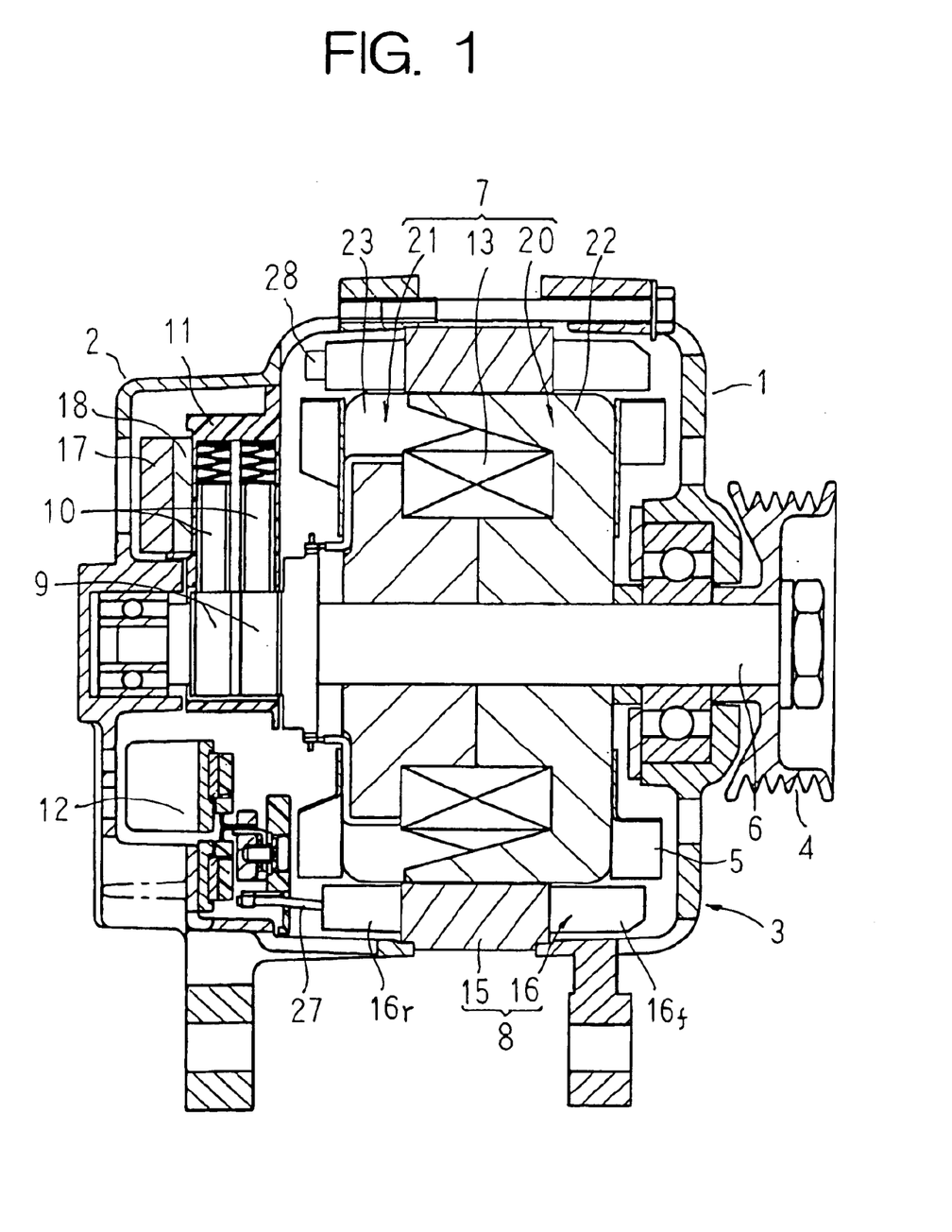
FIG. 1 is a longitudinal section showing an automotive alternator according to Embodiment 1 of the present invention.
Figure 2:
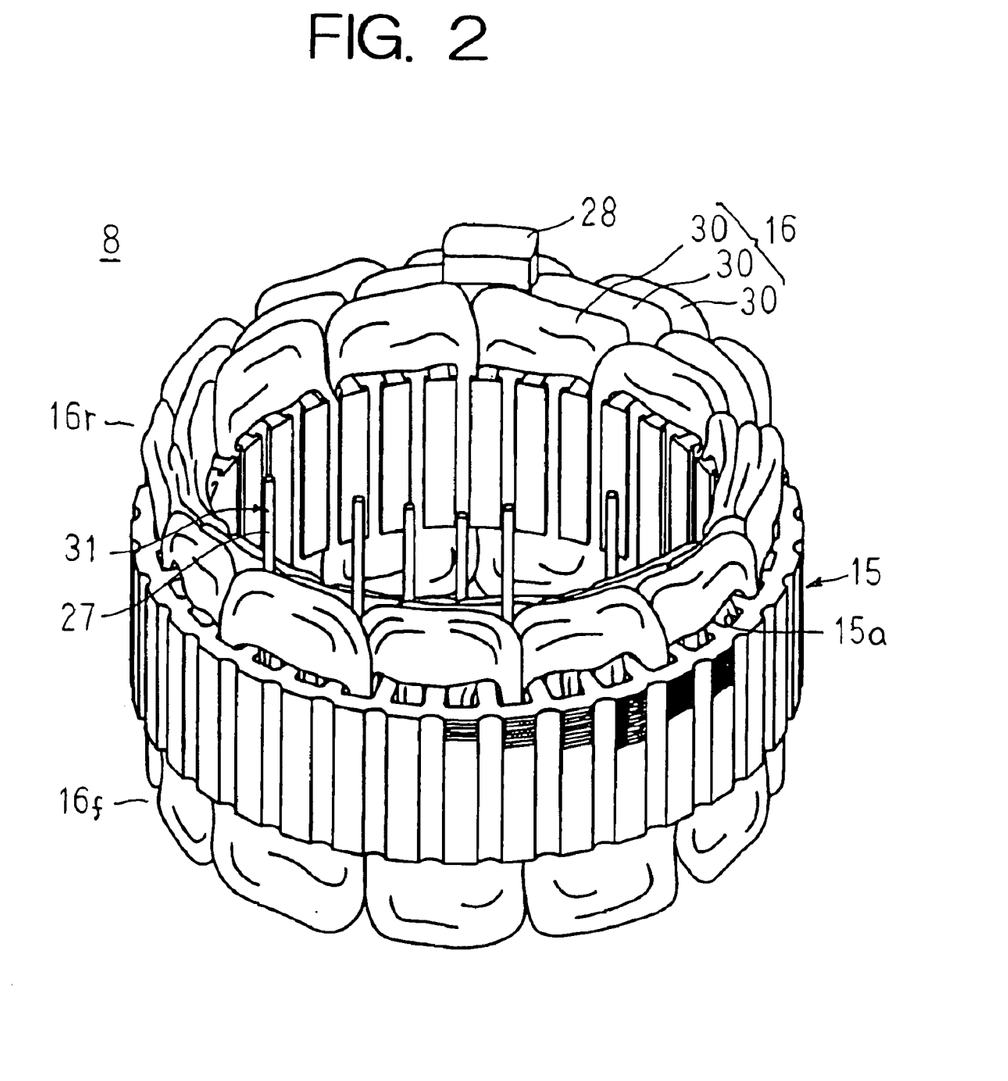
FIG. 2 is a perspective of a stator of the automotive alternator according to Embodiment 1 of the present invention viewed from a rear end.
Figure 3A:
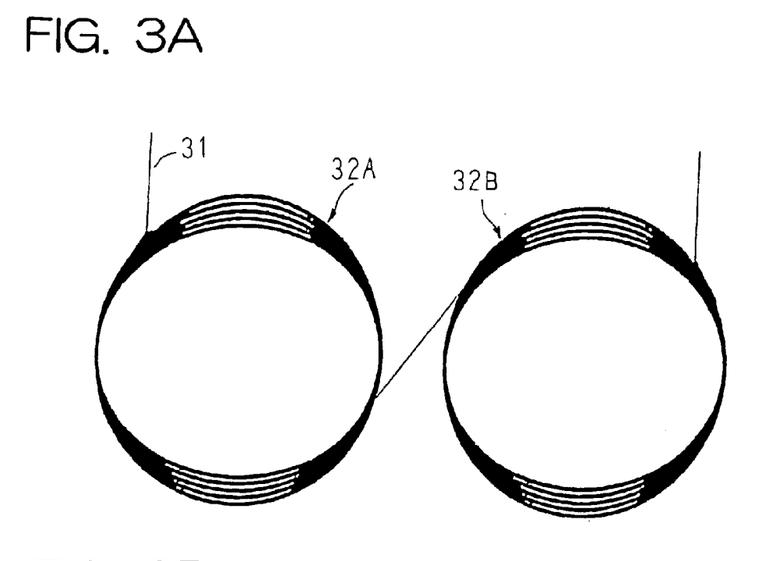
FIG. 3A is a process diagram explaining a method for manufacturing a stator winding used in the stator of the automotive alternator according to Embodiment 1 of the present invention.
Figure 3B:
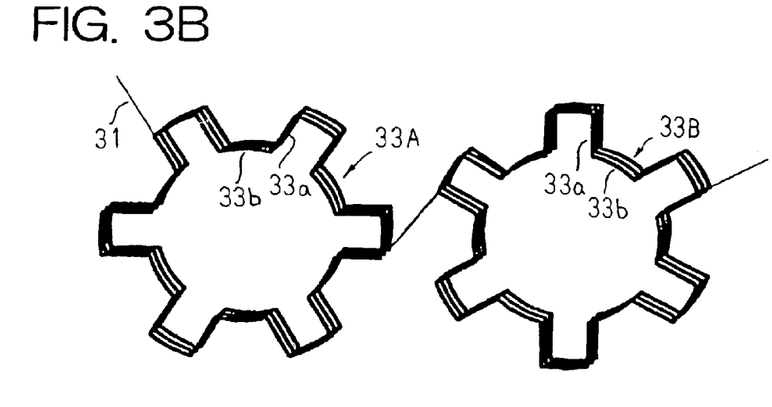
FIG. 3B is another process diagram explaining the method for manufacturing the stator winding used in the stator of the automotive alternator according to Embodiment 1 of the present invention.
Figure 3C:
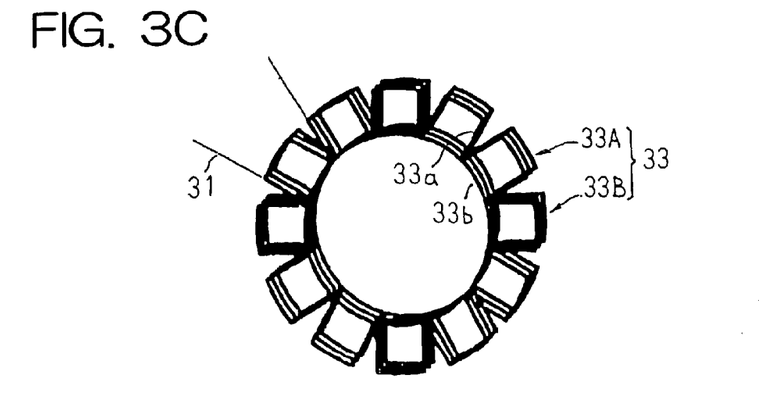
FIG. 3C is another process diagram explaining the method for manufacturing the stator winding used in the stator of the automotive alternator according to Embodiment 1 of the present invention.
Figure 4:
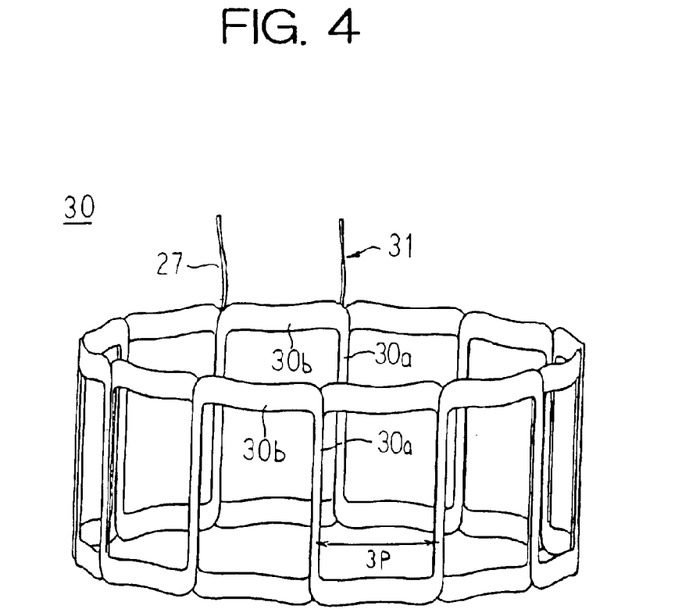
FIG. 4 is a perspective schematically showing a winding phase portion constituting the stator winding used in the stator of the automotive alternator according to Embodiment 1 of the present invention.

FIG. 1 is a longitudinal section showing an automotive alternator according to Embodiment 1 of the present invention, FIG. 2 is a perspective of a stator of the automotive alternator according to Embodiment 1 of the present invention viewed from a rear end, FIGS. 3A to 3C are process diagrams explaining a method for manufacturing a stator winding used in the stator of the automotive alternator according to Embodiment 1 of the present invention, and FIG. 4 is a perspective schematically showing a winding phase portion constituting the stator winding used in the stator of the automotive alternator according to Embodiment 1 of the present invention.

In FIGS. 1 and 2, an automotive alternator is provided with: a case 3 constituted by a front bracket 1 and a rear bracket 2 made of aluminum; a shaft 6 disposed inside the case 3, a pulley 4 secured to a first end portion of the shaft 6; a Lundell-type rotor 7 secured to the shaft 6; fans 5 secured to first and second axial end portions of the rotor 7; a stator 8 secured to the case 3 so as to envelop the rotor 7; slip rings 9 secured to a second end portion of the shaft 6 for supplying an electric current to the rotor 7; a pair of brushes 10 sliding on surfaces of the slip rings 9; a brush holder 11 for housing the brushes 10; a rectifier apparatus 12 electrically connected to the stator 8 for converting an alternating current generated in the stator 8 into a direct current; and a regulator 18 mounted to a heat sink 17 fitted onto the brush holder 11, the regulator 18 adjusting the magnitude of an alternating voltage generated in the stator 8.

The rotor 7 includes: a field winding 13 for generating a magnetic flux on passage of an electric current; and a pair of first and second pole cores 20 and 21 disposed so as to cover the field winding 13, magnetic poles being formed in the first and second pole cores 20 and 21 by the magnetic flux from the field winding. The first and second pole cores 20 and 21 are made of iron, having six first and six second claw-shaped magnetic poles 22 and 23, respectively, each of the claw-shaped magnetic poles 22 and 23 having a generally trapezoidal outermost diameter surface shape disposed on an outer circumferential edge portion at a uniform angular pitch in a circumferential direction so as to project axially, and the first and second pole cores 20 and 21 being fixed to the shaft 6 facing each other such that the first and second claw-shaped magnetic poles 22 and 23 intermesh.

The stator 8 is constituted by: a cylindrical stator core 15; and a stator winding 16 installed in the stator core 15. Slots 15a are formed in the stator core 15 at a ratio of one slot per phase per pole. In other words, since the number of magnetic poles in the rotor 7 is twelve, thirty-six slots 15a having grooves lying in an axial direction are arranged in a circumferential direction so as to open onto an inner circumferential side of the stator core 15. The stator winding 16 is provided with three winding phase portions 30 in each of which a continuous conductor wire 31 composed of a copper wire material covered with an electrically-insulating coating is installed in a wave winding in every third slot 15a. The winding phase portions 30 are mounted into the slots 15a of the stator core 15 so as to be offset by one slot from each other. The lead wires 27 of each of the winding phase portions 30 are lead out in an axial direction from an axial end of a rear-end coil end group 16r functioning as a first coil end group within a range of approximately 120 degrees centered around a central axis of the stator core 15 and are connected to terminals (not shown) of the rectifier apparatus 12. Thus, the three winding phase portions 30 are formed into an alternating-current connection to constitute the stator winding 16. The stator 8 is held between the front bracket 1 and the rear bracket 2 so as to form a uniform air gap between an inner circumferential surface of the stator core 15 and outer circumferential surfaces of the claw-shaped magnetic poles 22 and 23.

In the automotive alternator constructed in this manner, an electric current is supplied to the field winding 13 from a battery (not shown) by means of the brushes 10 and the slip rings 9, generating a magnetic flux. The first claw-shaped magnetic poles 22 in the first pole core 20 are magnetized into North-seeking (N) poles by this magnetic flux, and the second claw-shaped magnetic poles 23 in the second pole core 21 are magnetized into South-seeking (S) poles. At the same time, rotational torque from an engine is transmitted to the shaft 6 by means of a belt (not shown) and the pulley 4, rotating the rotor 7. Thus, a rotating magnetic field is imparted to the stator winding 16, generating an electromotive force in the stator winding 16. This alternating-current electromotive force passes through the rectifier apparatus 12 and is converted into a direct current, and the magnitude thereof is adjusted by the regulator 18, charging the battery.

Next, a configuration of the stator 8 will be explained with reference to FIGS. 3 and 4.

First, as shown in FIG. 3A, a first annular winding unit 32A is prepared by winding one conductor wire 31 into a ring shape for five winds, and a second annular winding unit 32B is prepared by continuing to wind the conductor wire 31 into another ring shape for another five winds. Next, as shown in FIG. 3B, first and second star-shaped winding sub-units 33A and 33B each having a star-shaped pattern in which end portions of adjacent pairs of straight portions 33a are alternately linked on an inner circumferential side and an outer circumferential side by bracket-shaped linking portions 33b are prepared by bending the first and second annular winding units 32A and 32B. In the first and second star-shaped winding sub-units 33A and 33B, twelve bundles of five straight portions 33a are arranged so as to have a predetermined pitch in a circumferential direction.

Thereafter, a star-shaped winding unit 33 is prepared, as shown in FIG. 3C, by folding over the portion of the conductor wire 31 linking the first and second star-shaped winding sub-units 33A and 33B, and stacking the first and second star-shaped winding sub-units 33A and 33B on top of each other such that the peak portions and the valley portions of the two star-shaped patterns are superposed, that is, such that the linking portions 33b are positioned opposite each other in a radial direction. In the star-shaped winding unit 33, twelve bundles of ten straight portions 33a are arranged so as to have a predetermined pitch in a circumferential direction.

Next, the winding phase portion 30 shown in FIG. 4 is obtained by shaping the star-shaped winding unit 33 into a cylindrical shape. In this winding phase portion 30, twelve bundles of ten slot-housed portions 30a are arranged at a pitch of three slots in a circumferential direction, and bundles of the coil ends 30b each linking five slot-housed portions 30a are positioned opposite each other in an axial direction. Moreover, the slot-housed portions 30a correspond to the straight portions 33a, and the coil ends 30b correspond to the linking portions 33b.

Next, a first winding phase portion 30 is mounted to the stator core 15 from an axial direction, for example, by bending the coil ends 30b at a first axial end radially inward. Here, the slot-housed portions 30a are inserted inside each of the slots 15a by moving root portions of the bent coil ends 30b in an axial direction through openings of the slots 15a. The slot-housed portions 30a are inserted completely inside the slots 15a, then the coil ends 30b are restored so as to extend in an axial direction. Thus, the first winding phase portion 30 is mounted to the stator core 15 such that the bundles of ten slot-housed portions 30a are housed in every third slot of the slots 15a. The bundles of five coil ends 30b are arranged at first and second axial ends of the stator core 15 in a single layer in a circumferential direction at a pitch of three slots from each other.

A second winding phase portion 30 is similarly mounted to the stator core 15 such that the slots 15a into which it is inserted are offset by one slot from the first winding phase portion 30. A third winding phase portion 30 is similarly mounted to the stator core 15 such that the slots 15a into which it is inserted are offset by one slot from the second winding phase portion 30. Thus, at first and second axial ends of the stator core 15, the bundles of five coil ends 30b are arranged in a circumferential direction so as to form three layers in a radial direction, thereby constituting front-end and rear-end coil end groups 16f and 16r.

Next, a first mass adjusting portion 28 is mounted to an apex portion of the rear-end coil end group 16r on an opposite side of the central axis of the stator core 15 from the lead wires 27 of the winding phase portions 30, and a varnish (not shown) is further impregnated inside the slots 15a, thereby providing the stator 8 shown in FIG. 2. This first mass adjusting portion 28 is constructed by mounting a resin material such as an epoxy resin, a silicone resin, etc., to the apex portion of the rear-end coil end group 16r to correct circumferential mass imbalances due to the disposition of the lead wires 27.

In the stator 8 constructed in this manner, the slot-housed portions 30a are fixed to the stator core 15 by the varnish. Root regions of the lead wires 27 are also fixed to the stator core 15 inside the slots 15a by the varnish, and portions projecting axially outward from the axial end of the rear-end coil end group 16r vibrate easily. Moreover, because the lead wires 27 are disposed so as to be distributed within a range of approximately 120 degrees centered around the central axis of the rear-end coil end group 16f, circumferential mass centered around the central axis of the stator core 15 becomes unbalanced (a circumferential mass imbalance). The first mass adjusting portion 28 is disposed on the apex portion of the rear-end coil end group 16r so as to relieve this circumferential mass imbalance. In addition, this first mass adjusting portion 28 is formed so as not to protrude radially inside or outside the rear-end coil end group 16r.

In Embodiment 1, because the circumferential mass imbalance resulting from the lead wires 27 being disposed so as to be distributed in a range of approximately 120 degrees centered around the central axis of the rear-end coil end group 16f is relieved by the first mass adjusting portion 28, even if the stator 8 is subjected to vibration, the lead wires 27 are prevented from vibrating excessively and subjecting the stator winding 16 to vibration.

As a result, the propagation to the stator winding 16 of vibration which causes wire breakages in the continuous conductor wires 31 is prevented, thereby providing a highly-reliable stator without defective power generation. The amplification of vibration in the stator 8 is also suppressed, reducing the propagation of vibration to the case 3 supporting the stator 8 as well, thereby enabling the reliability of the alternator to be increased.

Because the first mass adjusting portion 28 is formed so as not to protrude radially inside or outside the rear-end coil end group 16r, contact does not occur with the case 3 or case internal components, and thus mountability of the stator 8 to the case 3 does not deteriorate. Furthermore, because the first mass adjusting portion 28 is disposed on an axial end of the rear-end coil end group 16r, the circumferential mass imbalance can be adjusted by changing the height, or the circumferential position, etc., of the first mass adjusting portion 28, simplifying the operation of adjusting the circumferential mass imbalance.

Moreover, in Embodiment 1 above, the first mass adjusting portion 28 is disposed in a single position on an opposite side of the central axis of the stator core 15 from the lead wires 27, but a plurality of first mass adjusting portions 28 may also be disposed so as to be distributed over a predetermined circumferential range on an opposite side of the central axis of the stator core 15 from the lead wires 27. For example, first mass adjusting portions 28 may also be disposed so as to be distributed in positions that are axisymmetric relative to each of the lead wires 27.

In Embodiment 1 above, winding phase portions 30 that are each prepared by winding one continuous conductor wire 31 are used, but winding phase portions that are each prepared by winding two continuous conductor wires 31 may also be used. In that case, because the number of lead wires 27 is doubled, the mass of the first mass adjusting portion 28 (or the number of first mass adjusting portions 28) must also be increased proportionately.

In Embodiment 1 above, a stator core 15 in which slots 15a are formed at a ratio of one slot per phase per pole is used, but a stator core in which the slots 15a are formed into at a ratio of two slots per phase per pole may also be used. In that case, because the number of winding phase portions 30 is doubled and the number of lead wires 27 is also increased, the mass of the first mass adjusting portion 28 (or the number of first mass adjusting portions 28) must also be increased so as to match the increase in the number of lead wires 27.

Embodiment 2

Figure 5:
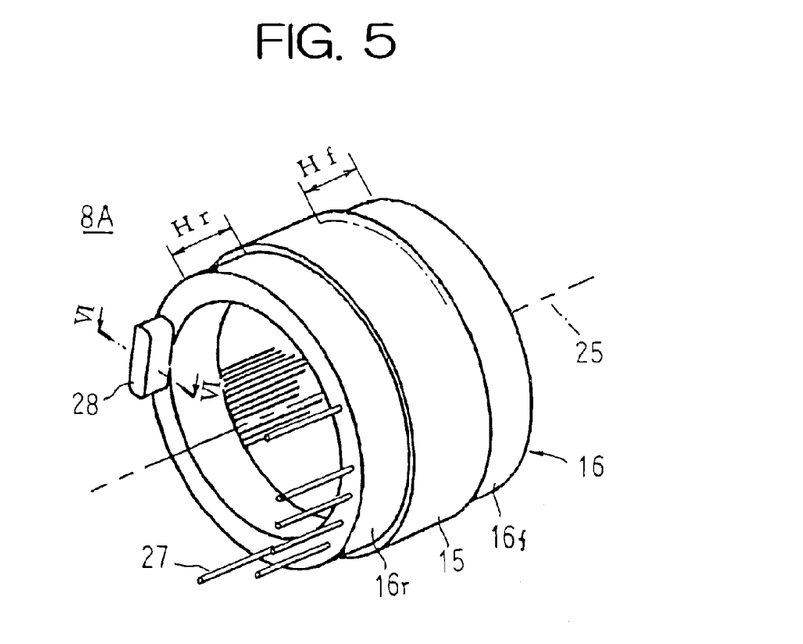
FIG. 5 is a perspective schematically showing a stator of an automotive alternator according to Embodiment 2 of the present invention.
Figure 6:
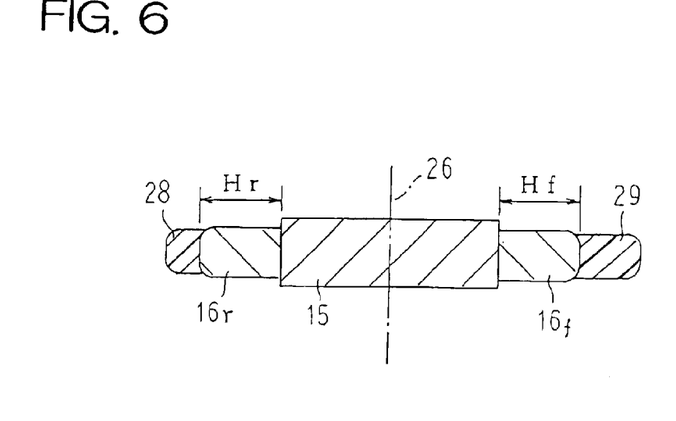
FIG. 6 is a cross section taken along line VI—VI in FIG. 5 viewed from the direction of the arrows.

FIG. 5 is a perspective schematically showing a stator of an automotive alternator according to Embodiment 2 of the present invention, and FIG. 6 is a cross section taken along line VI—VI in FIG. 5 viewed from the direction of the arrows.

In FIGS. 5 and 6, a second mass adjusting portion 29 is mounted to an apex portion of the front-end coil end group 16f to adjust an imbalance in mass between the front end and the rear end of the stator core 15 relative to a plane 26 perpendicular to the central axis 25 at an axial center of the central axis 25 (an axial mass imbalance).

Moreover, Embodiment 2 is constructed in a similar manner to Embodiment 1 above except for the fact that the second mass adjusting portion 29 is provided.

In this stator 8A, because the height Hf of the front-end coil end group 16f and the height Hr of the rear-end coil end group 16r are equal, the mass at the front end and the rear end of the stator 8A would be balanced relative to the plane 26 if there were no lead wires 27 and no first mass adjusting portion 28. In other words, the mass at the front end and the rear end of the stator 8A becomes unbalanced relative to the plane 26 due to the disposition of the lead wires 27 and the first mass adjusting portion 28.

In Embodiment 2, a second mass adjusting portion 29 is mounted to an apex portion of the front-end coil end group 16f to relieve the axial mass imbalance resulting from the disposition of the lead wires 27 and the first mass adjusting portion 28. Thus, even if the stator 8A is subjected to vibration, the lead wires 27 are reliably prevented from vibrating excessively and subjecting the stator winding 16 to vibration.

As a result, the propagation to the stator winding 16 of vibration which causes wire breakages in the continuous conductor wires 31 is prevented, thereby providing a highly-reliable stator without defective power generation. The amplification of vibration in the stator 8A is also suppressed, reducing the propagation of vibration to the case 3 supporting the stator 8A as well, thereby enabling the reliability of the alternator to be increased.

Embodiment 3

Figure 7:
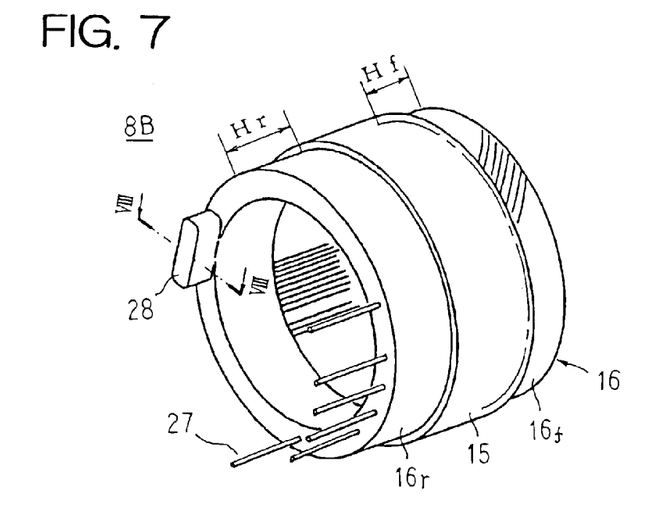
FIG. 7 is a perspective schematically showing a stator of an automotive alternator according to Embodiment 3 of the present invention.
Figure 8:
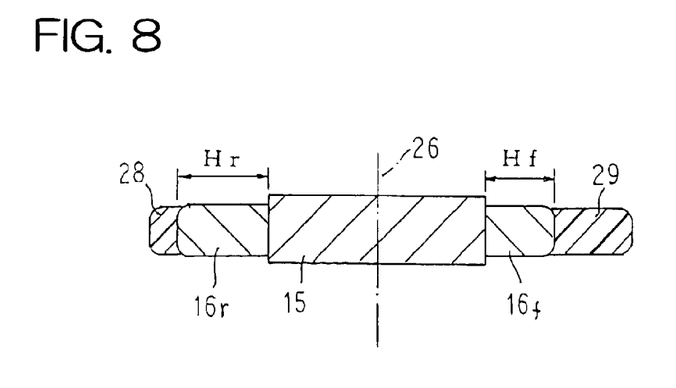
FIG. 8 is a cross section taken along line VIII—VIII in FIG. 7 viewed from the direction of the arrows.

FIG. 7 is a perspective schematically showing a stator of an automotive alternator according to Embodiment 3 of the present invention, and FIG. 8 is a cross section taken along line VIII—VIII in FIG. 7 viewed from the direction of the arrows.

In FIGS. 7 and 8, a second mass adjusting portion 29 is mounted to an apex portion of the front-end coil end group 16f to adjust an imbalance in mass between the front end and the rear end of the stator core 15 relative to a plane 26 perpendicular to the central axis 25 at an axial center of the central axis 25 (an axial mass imbalance).

In this stator 8B, because the height Hr of the rear-end coil end group 16r is higher than the height Hf of the front-end coil end group 16f, the mass at the rear end of the stator 8B would be greater than the mass at the front end relative to the plane 26 even if there were no lead wires 27 and no first mass adjusting portion 28.

In Embodiment 3, a second mass adjusting portion 29 is mounted to an apex portion of the front-end coil end group 16f to relieve the axial mass imbalance resulting from the disposition of the lead wires 27 and the first mass adjusting portion 28, and the axial mass imbalance resulting from the difference in the heights of the front-end and rear-end coil end groups 16f and 16r. Thus, even if the stator 8B is subjected to vibration, the lead wires 27 are reliably prevented from vibrating excessively and subjecting the stator winding 16 to vibration.

As a result, the propagation to the stator winding 16 of vibration which causes wire breakages in the continuous conductor wires 31 is prevented, thereby providing a highly-reliable stator without defective power generation. The amplification of vibration in the stator 8B is also suppressed, reducing the propagation of vibration to the case 3 supporting the stator 8B as well, thereby enabling the reliability of the alternator to be increased.

Embodiment 4

Figure 9:
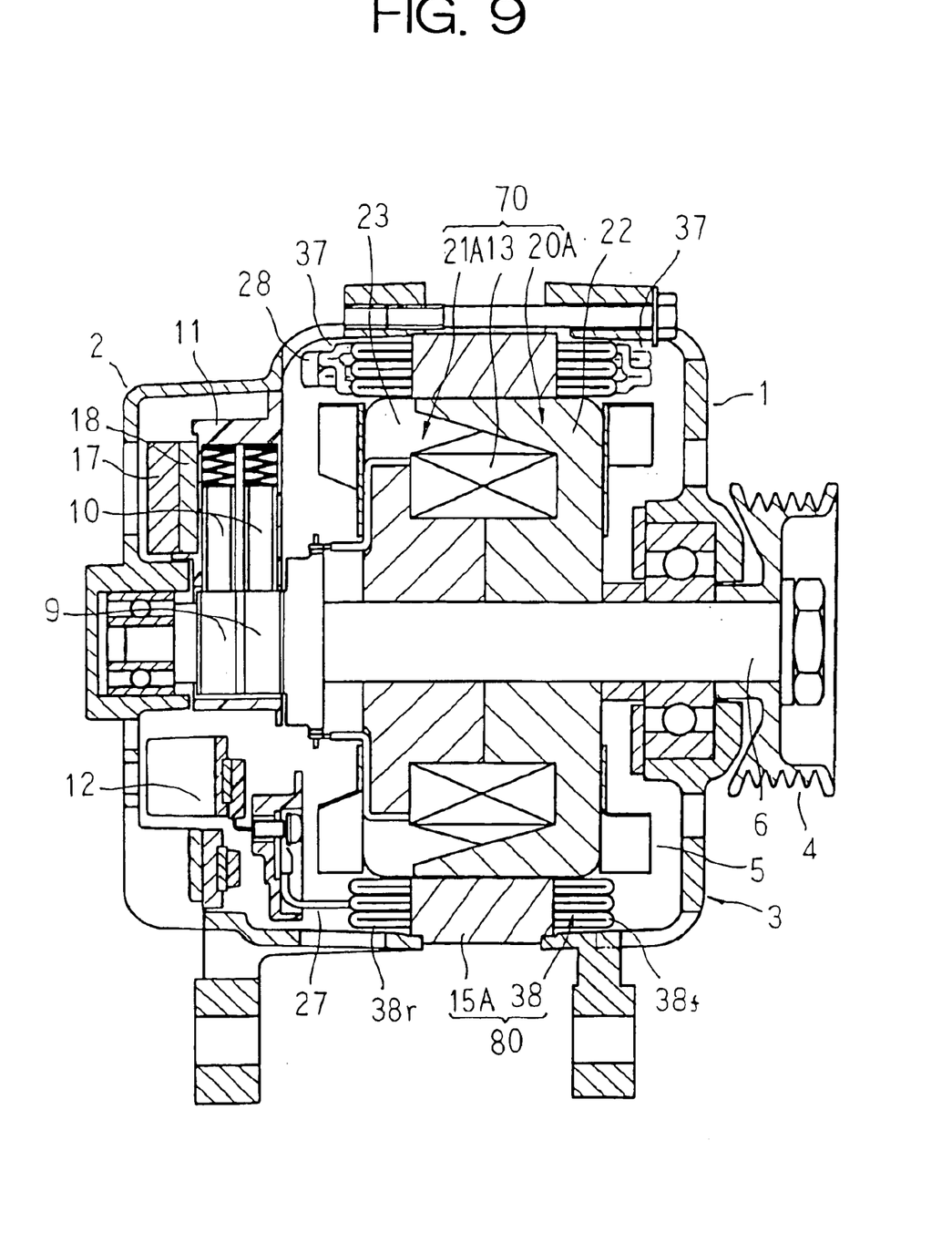
FIG. 9 is a longitudinal section showing an automotive alternator according to Embodiment 4 of the present invention.
Figure 10:
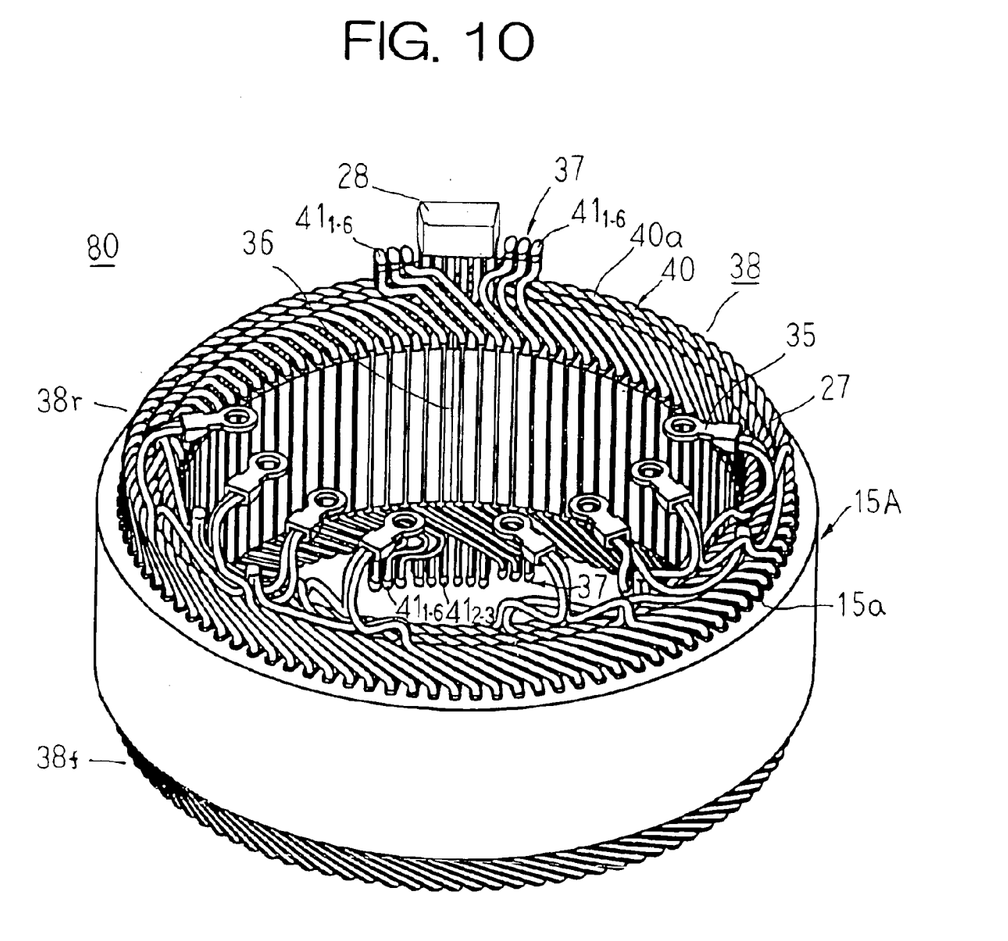
FIG. 10 is a perspective of a stator of the automotive alternator according to Embodiment 4 of the present invention viewed from a rear end.
Figure 11:
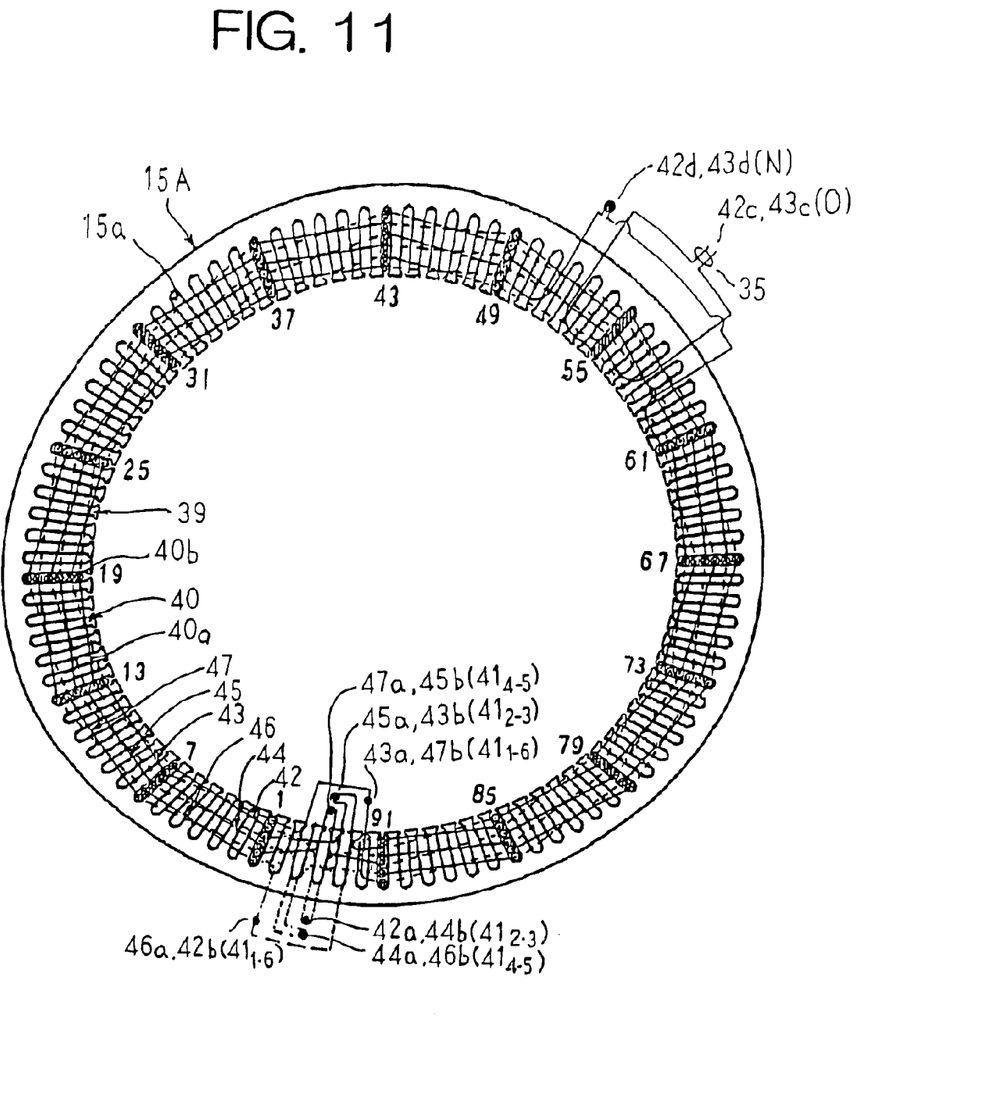
FIG. 11 is a rear-end end elevation schematically showing a first winding phase portion of a stator winding in the stator of the automotive alternator according to Embodiment 4 of the present invention.
Figure 12:
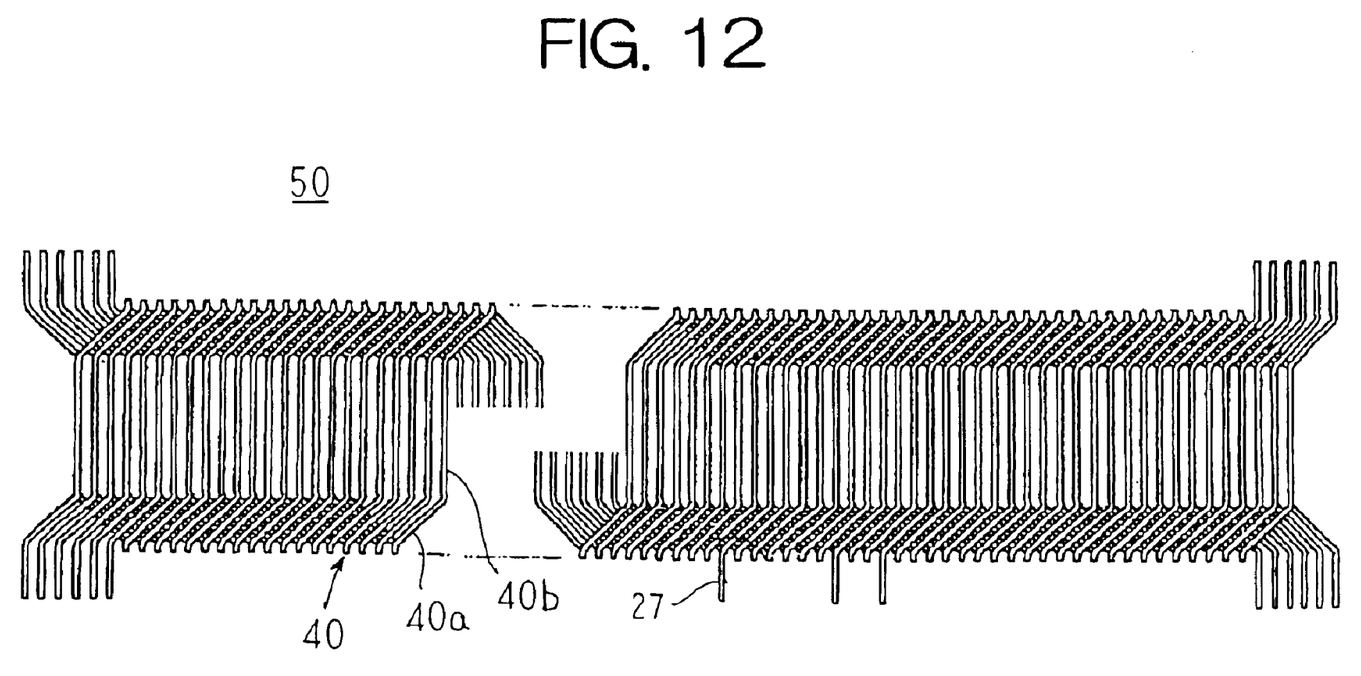
FIG. 12 is a plan explaining a winding assembly constituting part of the stator winding of the stator of the automotive alternator according to Embodiment 4 of the present invention.
Figure 13:
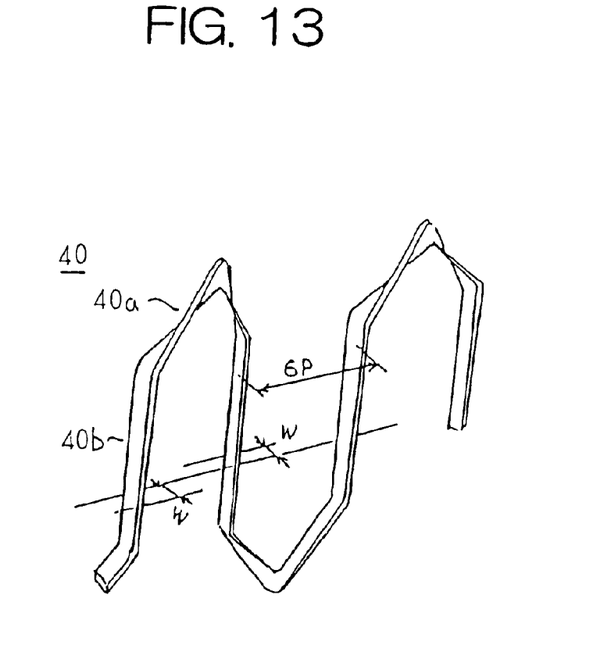
FIG. 13 is a perspective showing a continuous conductor wire constituting part of the winding assembly shown in FIG. 12.
Figure 14:
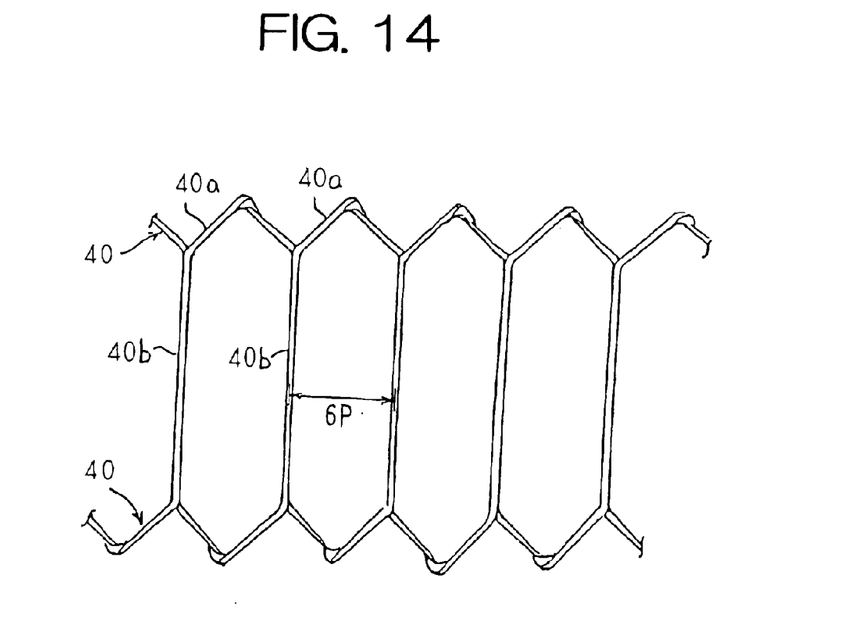
FIG. 14 is a partial perspective showing a pair of continuous conductor wires constituting part of the winding assembly shown in FIG. 12.

FIG. 9 is a longitudinal section showing an automotive alternator according to Embodiment 4 of the present invention, FIG. 10 is a perspective of a stator of the automotive alternator according to Embodiment 4 of the present invention viewed from a rear end, FIG. 11 is a rear-end end elevation schematically showing a first winding phase portion of a stator winding in the stator of the automotive alternator according to Embodiment 4 of the present invention, FIG. 12 is a plan explaining a winding assembly constituting part of the stator winding of the stator of the automotive alternator according to Embodiment 4 of the present invention, FIG. 13 is a perspective showing a continuous conductor wire constituting part of the winding assembly shown in FIG. 12, and FIG. 14 is a partial perspective showing a pair of continuous conductor wires constituting part of the winding assembly shown in FIG. 12. Moreover, in FIG. 11, solid lines indicate connections at the rear end of the stator core, broken lines indicate connections at the front end of the stator core, black dots indicate joint portions, and 1, 7, 13, etc., through 91 represent slot numbers.

In FIGS. 9 and 10, a rotor 70 includes: a field winding 13 for generating a magnetic flux on passage of an electric current; and a pair of first and second pole cores 20A and 21A disposed so as to cover the field winding 13, magnetic poles being formed in the first and second pole cores 20A and 21A by the magnetic flux from the field winding. The first and second pole cores 20A and 21A are made of iron, having eight first and eight second claw-shaped magnetic poles 22 and 23, respectively, each of the claw-shaped magnetic poles 22 and 23 having a generally trapezoidal outermost diameter surface shape disposed on an outer circumferential edge portion at a uniform angular pitch in a circumferential direction so as to project axially, and the first and second pole cores 20A and 21A being fixed to the shaft 6 facing each other such that the first and second claw-shaped magnetic poles 22 and 23 intermesh.

A stator 80 is constituted by: a cylindrical stator core 15A; and a stator winding 38 installed in the stator core 15A. Slots 15a are formed in the stator core 15A at a ratio of two slots per phase per pole. In other words, since the number of magnetic poles in the rotor 70 is sixteen, ninety-six slots 15a having grooves lying in an axial direction are arranged in a circumferential direction so as to open onto an inner circumferential side of the stator core 15A. The stator winding 38 is provided with six winding phase portions 39 in each of which a continuous conductor wire 40 composed of a copper wire material having a rectangular cross section covered with an electrically-insulating coating is installed in a wave winding in every sixth slot 15a. The winding phase portions 39 are mounted into the slots 15a of the stator core 15A so as to be offset by one slot from each other. The lead wires 27 of each of the winding phase portions 39 are lead out in an axial direction from an axial end of a rear-end coil end group 38r functioning as a first coil end group within a range of approximately 120 degrees centered around a central axis of the stator core 15A and are connected to terminals (not shown) of rectifier apparatuses 12. Thus, the stator winding 38 is composed of two three-phase alternating-current windings each composed of three winding phase portions 30 formed into an alternating-current connection. To relieve circumferential mass imbalances due to the disposition of the lead wires 27, a first mass adjusting portion 28 is mounted to an entail connection portion 37 of the rear-end coil end group 38r on an opposite side of the central axis of the stator core 15A from the lead wires 27 of the winding phase portions 39 so as not to protrude radially inside or outside.

Moreover, the automotive alternator according to Embodiment 4 is constructed in a similar manner to the automotive alternator according to Embodiment 1 above except for the fact that this rotor 70 and stator 80 are used instead of that rotor 7 and stator 8.

Here, a specific construction of the stator winding 38 will be explained with reference to FIG. 11. Moreover, to facilitate explanation, Slot Numbers from 1 to 96 are allocated to each of the slots 15a as shown in FIG. 11, and the positions in each of the slots 15a in which the conductor segments 40 are housed are designated Address 1, Address 2, etc., through Address 6, respectively, from an inner circumferential side.

A first winding phase portion 39 is constituted by first to sixth winding sub-portions 42 to 47 each composed of one continuous conductor wire 40.

The first winding sub-portion 42 is constructed by wave winding one continuous conductor wire 40 into every sixth slot from Slot Numbers 1 to 91 so as to alternately occupy Address 2 and Address 1 in the slots 15a. The second winding sub-portion 43 is constructed by wave winding a continuous conductor wire 40 into every sixth slot from Slot Numbers 1 to 91 so as to alternately occupy Address 1 and Address 2 in the slots 15a. The third winding sub-portion 44 is constructed by wave winding a continuous conductor wire 40 into every sixth slot from Slot Numbers 1 to 91 so as to alternately occupy Address 4 and Address 3 in the slots 15a. The fourth winding sub-portion 45 is constructed by wave winding a continuous conductor wire 40 into every sixth slot from Slot Numbers 1 to 91 so as to alternately occupy Address 3 and Address 4 in the slots 15a. The fifth winding sub-portion 46 is constructed by wave winding a continuous conductor wire 40 into every sixth slot from Slot Numbers 1 to 91 so as to alternately occupy Address 6 and Address 5 in the slots 15a. The sixth winding sub-portion 47 is constructed by wave winding a continuous conductor wire 40 into every sixth slot from Slot Numbers 1 to 91 so as to alternately occupy Address 5 and Address 6 in the slots 15a. In each of the slots 15a, straight portions 40b (slot-housed portions) of the six continuous conductor wires 40 are arranged so as to line up in one column in a radial direction (a slot depth direction) with longitudinal axes of their rectangular cross sections aligned radially.

At a first end (the rear end) of the stator core 15A, a first end portion 43a of the second winding sub-portion 43 extending outward from Address 1 of Slot Number 1 and a second end portion 47b of the sixth winding sub-portion 47 extending outward from Address 6 of Slot Number 91 are joined, a first end portion 45a of the fourth winding sub-portion 45 extending outward from Address 3 of Slot Number 1 and a second end portion 43b of the second winding sub-portion 43 extending outward from Address 2 of Slot Number 91 are joined, and a first end portion 47a of the sixth winding sub-portion 47 extending outward from Address 5 of Slot Number 1 and a second end portion 45b of the fourth winding sub-portion 45 extending outward from Address 4 of Slot Number 91 are joined to form a three-turn wave winding in which the second, fourth, and sixth winding sub-portions 43, 45, and 47 are connected in series. Moreover, a first near-address joint portion $41_{2\text{-}3}$ constituting a joint portion between the first end portion 45a of the fourth winding sub-portion 45 and the second end portion 43b of the second winding sub-portion 43 and a second near-address joint portion $41_{4\text{-}5}$ constituting a joint portion between the first end portion 47a of the sixth winding sub-portion 47 and the second end portion 45b of the fourth winding sub-portion 45 are lined up in one column in a radial direction so as to be separated from each other at the same axial height.

Here, a first end portion region of the continuous conductor wire 40 constituting the second winding sub-portion 43 extends outward from Address 1 of slot 15a Number 1, bends and extends for a predetermined distance in a counterclockwise direction in FIG. 11 above a rear-end end surface of the stator core 15A, then bends axially outward, next bends radially outward, and finally bends axially outward. A second end portion region of the continuous conductor wire 40 constituting the sixth winding sub-portion 47 extends outward from Address 6 of slot 15a Number 91, bends and extends for a predetermined distance in a clockwise direction in FIG. 11 above the rear-end end surface of the stator core 15A, then bends axially outward, next bends radially inward, and finally bends axially outward. The first end portion 43a of the continuous conductor wire 40 constituting the second winding sub-portion 43 and the second end portion 47b of the continuous conductor wire 40 constituting the sixth winding sub-portion 47 are joined. Thus, a distant-address joint portion $41_{1\text{-}6}$ constituting a joint portion between the first end portion 43a of the second winding sub-portion 43 and the second end portion 47b of the sixth winding sub-portion 47 is arranged so as to be offset by three slots in a counterclockwise direction in FIG. 11 at the same axial height as the first and second near-address joint portions $41_{2\text{-}3}$ and $41_{4\text{-}5}$ which line up in a radial direction.

At the front end of the stator core 15A, a first end portion 42a of the first winding sub-portion 42 extending outward from Address 2 of Slot Number 1 and a second end portion 44b of the third winding sub-portion 44 extending outward from Address 3 of Slot Number 91 are joined, a first end portion 44a of the third winding sub-portion 44 extending outward from Address 4 of Slot Number 1 and a second end portion 46b of the fifth winding sub-portion 46 extending outward from Address 5 of Slot Number 91 are joined, and a first end portion 46a of the fifth winding sub-portion 46 extending outward from Address 6 of Slot Number 1 and a second end portion 42b of the first winding sub-portion 42 extending outward from Address 1 of Slot Number 91 are joined to form a three-turn wave winding in which the first, third, and fifth winding sub-portions 42, 44, and 46 are connected in series. Moreover, a first near-address joint portion $41_{2\text{-}3}$ constituting a joint portion between the first end portion 42a of the first winding sub-portion 42 and the second end portion 44b of the third winding sub-portion 44 and a second near-address joint portion $41_{4\text{-}5}$ constituting a joint portion between the first end portion 44a of the third winding sub-portion 44 and the second end portion 46b of the fifth winding sub-portion 46 are lined up in one column in a radial direction so as to be separated from each other at the same axial height.

Here, a first end portion region of the continuous conductor wire 40 constituting the fifth winding sub-portion 46 extends outward from Address 6 of slot 15a Number 1, bends and extends for a predetermined distance in a counterclockwise direction in FIG. 11 above a front-end end surface of the stator core 15A, then bends axially outward, next bends radially inward, and finally bends axially outward. A second end portion region of the continuous conductor wire 40 constituting the first winding sub-portion 42 extends outward from Address 1 of slot 15a Number 91, bends and extends for a predetermined distance in a clockwise direction in FIG. 11 above a front-end end surface of the stator core 15A, then bends axially outward, next bends radially outward, and finally bends axially outward. The first end portion 46a of the continuous conductor wire 40 constituting the fifth winding sub-portion 46 and the second end portion 42a of the continuous conductor wire 40 constituting the first winding sub-portion 42 are joined. Thus, the distant-address joint portion $41_{1\text{-}6}$ constituting a joint portion between the first end portion 46a of the fifth winding sub-portion 46 and the second end portion 42b of the first winding sub-portion 42 is arranged so as to be offset by three slots in a clockwise direction in FIG. 11 at the same axial height as the first and second near-address joint portions $41_{2\text{-}3}$ and $41_{4\text{-}5}$ which line up in a radial direction.

A portion of the continuous wire 40 of the first winding sub-portion 42 projecting outward at the rear end of the stator core 15A from Slot Numbers 49 and 55 is cut, and a portion of the continuous wire 40 of the second winding sub-portion 43 projecting outward at the rear end of the stator core 15A from Slot Numbers 55 and 61 is cut. Then, the three-turn first winding phase portion 39 is formed such that the first, third, and fifth winding sub-portions 42, 44, and 46 connected in series and the second, fourth, and sixth winding sub-portions 43, 45, and 47 connected in series are connected in parallel by connecting a first cut end 42c of the first winding sub-portion 42 and a first cut end 43c of the second winding sub-portion 43 to a metal connection fitting 35 and joining together a second cut end 42d of the first winding sub-portion 42 and a second cut end 43d of the second winding sub-portion 43.

Moreover, the first cut end 42c of the first winding sub-portion 42 and the first cut end 43c of the second winding sub-portion 43 become an output wire (O) of the first winding phase portion 39, and the second cut end 42d of the first winding sub-portion 42 and the second cut end 43d of the second winding sub-portion 43 become a neutral point lead wire (N) of the first winding phase portion 39.

Moreover, only the first winding phase portion 39, which is installed in a first slot group including Slot Numbers 1, 7, etc., through 91, is shown in FIG. 11, but second to sixth winding phase portions 39 are similarly installed in a second slot group including Slot Numbers 2, 8, etc., through 92, a third slot group including Slot Numbers 3, 9, etc., through 93, a fourth slot group including Slot Numbers 4, 10, etc., through 94, a fifth slot group including Slot Numbers 5, 11, etc., through 95, and a sixth slot group including Slot Numbers 6, 12, etc., through 96, respectively. The distant-address joint portions $41_{1-6}$ of the fourth to sixth slot groups are arranged at the rear end so as to be offset by three slots in a clockwise direction in FIG. 11 at the same axial height as the first and second adjacent-address joint portions $41_{2-3}$ and $41_{4-5}$ which line up in a radial direction, and distant-address joint portions $41_{1-6}$ are arranged at the front end so as to be offset by three slots in a counterclockwise direction in FIG. 11 at the same axial height as the first and second adjacent-address joint portions $41_{2-3}$ and $41_{4-5}$ which line up in a radial direction.

At the rear end of a stator winding 38 constructed in this manner, the return portions 40a of the continuous conductor wires 40 extending outward from the slots 15a and entering slots 15a six slots away are arranged at a pitch of one slot in a circumferential direction so as to form three rows in an annular shape, constituting a rear-end coil end group 38r. The rear-end entail connection portion 37 is constructed by arranging six pairs of first and second near-address joint portions $41_{2-3}$ and $41_{4-5}$ lined up in single columns radially at a pitch of one slot in a circumferential direction above the return portions 40a of the rear-end coil end group 38r, and arranging groups of three distant-address joint portions $41_{1-6}$ at a pitch of one slot at first and second circumferential ends of the six pairs of first and second near-address joint portions $41_{2-3}$ and $41_{4-5}$.

Similarly, at the front end of a stator winding 38, the return portions 40a of the continuous conductor wires 40 extending outward from the slots 15a and entering slots 15a six slots away are arranged at a pitch of one slot in a circumferential direction so as to form three rows in an annular shape, constituting a front-end coil end group 38f. A front-end entail connection portion 37 is constructed by arranging six pairs of first and second near-address joint portions $41_{2-3}$ and $41_{4-5}$ lined up in single columns radially at a pitch of one slot in a circumferential direction above the return portions 40a of the front-end coil end group 38f, and arranging groups of three distant-address joint portions $41_{1-6}$ at a pitch of one slot at first and second circumferential ends of the six pairs of first and second near-address joint portions $41_{2-3}$ and $41_{4-5}$.

Next, the first mass adjusting portion 28 is mounted to the entail connection portion 37 of the rear-end coil end group 38r on an opposite side of the central axis of the stator core 15A from the output wires (O) and the neutral-point lead wires (N) of the winding phase portions 39, and a varnish (not shown) is further impregnated inside the slots 15a. This first mass adjusting portion 28 is constructed by mounting a resin material such as an epoxy resin, a silicone resin, etc., to an apex portion of the rear-end entail connection portion 37 to relieve circumferential mass imbalances due to the disposition of the output wires (O) and the neutral-point lead wires (N).

A first three-phase alternating-current winding is prepared by connecting together each of the neutral-point lead wires (N) of the first, third, and fifth winding phase portions 39 installed in the first slot group, the third slot group, and the fifth slot group, respectively, to form the first, third, and fifth winding phase portions 39 into a Y connection (an alternating-current connection). Similarly, a second three-phase alternating-current winding is prepared by connecting together each of the neutral-point lead wires (N) of the second, fourth, and sixth winding phase portions 39 installed in the second slot group, the fourth slot group, and the sixth slot group, respectively, to form the second, fourth, and sixth winding phase portions 39 into a Y connection (an alternating-current connection). Finally, the stator 80 shown in FIG. 10 is prepared by connecting a metal connection fitting 35 to each of the neutral-point lead wires (N). Moreover, the output wires (O) and the neutral-point lead wires (N) constitute the lead wires 27 of the winding phase portions 39.

In the stator 80 constructed in this manner, each of the continuous conductor wires 40 constituting the first to sixth winding sub-portions 42 to 47 is installed in a wave winding so as to extend outward from any given slot 15a at an end surface of the stator core 15A, fold over, and enter a slot 15a six slots away. Each of the continuous conductor wires 40 is installed in every sixth slot so as to alternately occupy an inner layer and an outer layer in a slot depth direction (a radial direction).

As shown in FIG. 9, this stator 80 is mounted to an automotive alternator so as to be held between a front bracket 1 and a rear bracket 2 such that a uniform air gap is formed between outer circumferential surfaces of the first and second claw-shaped magnetic poles 22 and 23 and an inner circumferential surface of the stator core 15A. The neutral-point lead wires (N) and the output wires (O) of the first and second three-phase alternating current windings constituting the stator winding 38 are connected to separate rectifier apparatuses 12 such that the direct-current outputs from each of the rectifier apparatuses 12 are connected in parallel and combined.

Next, a winding assembly 50 constituting part of the stator winding 38 will be explained with reference to FIGS. 12 to 14.

The winding assembly 50 is formed by simultaneously folding twelve continuous conductor wires 40 (strands of wire) arranged parallel to each other on a plane at a pitch of one slot. Here, the lead wires 27 are formed simultaneously by adjusting the amount of continuous conductor wire 40 paid out as required.

As shown in FIG. 13, each of the continuous conductor wires 40 is shaped by bending into a planar pattern in which straight portions 40b linked by return portions 40a are arranged at a pitch of six slots (6P). Adjacent pairs of the straight portions 40b are offset by the return portions 40a by a width (w) of the continuous conductor wires 40 in a direction perpendicular to the direction of disposal of the straight portions 40b. Pairs of continuous conductor wires 40 are formed such that continuous conductor wires 40 shaped by bending in this manner are arranged so as to be offset by a pitch of six slots with straight portions 40b stacked (as shown in FIG. 14), the winding assembly 50 being constructed such that six of these pairs are arranged so as to be offset by a pitch of one slot from each other.

In this winding assembly 50, as shown in FIG. 12, ninety-six pairs of straight portions 40b are arranged at a pitch of one slot, and six end portions of the continuous conductor wires 40 extend outward on first and second sides at first and second ends of the winding assembly 50. The end portions of the continuous conductor wires 40 extending outward on the first and second sides at the first and second ends of the winding assembly 50 correspond to the end portions 42a to 47a and 42b to 47b of the first to sixth winding sub-portions 42 to 47 in FIG. 11.

Although not shown, a rectangular parallelepiped laminated core is prepared by laminating a large number of strip-shaped bodies each composed of a magnetic steel sheet in which slots are formed at a predetermined pitch and integrating the strip-shaped bodies by laser welding, for example. Next, three winding assemblies 50 are mounted to the rectangular parallelepiped laminated core so as to be stacked in a slot depth direction. Here, six straight portions 40b are housed in each of the slots of the laminated core so as to line up in single columns with the longitudinal axes of the rectangular cross sections thereof aligned in the slot depth direction. Then, an annular stator core 15A is prepared by rolling up the laminated core, abutting the end portions of the laminated core, and joining them integrally by laser welding, for example.

Thereafter, the electrically-insulating coating on the end portions of the continuous conductor wires 40 is removed to expose the copper wire material, the connection process shown in FIG. 11 is applied, the first mass adjusting portion 28 is disposed on the rear-end entail connection portion 37, and the stator 80 shown in FIG. 10 is prepared by applying the varnish (not shown) to the front-end and rear-end coil end groups 38f and 38r.

Thus, in Embodiment 4, because circumferential mass imbalances due to the disposition of the output wires (O) and the neutral-point lead wires (N) functioning as lead wires 27 are relieved by mounting the first mass adjusting portion 28 to the entail connection portion 37 of the rear-end coil end group 38r, the propagation of vibrations which could lead to wire breakages in the continuous conductor wires 40 is also prevented, and the propagation of vibration to the case 3 is also reduced, in a similar manner to Embodiment 1 above, increasing reliability.

Because the first mass adjusting portion 28 is disposed on the entail connection portion 37, which projects axially outward from the axial end of the rear-end coil end group 38r, the mass and height of the first mass adjusting portion 28 itself can also be reduced, simplifying the operation of adjusting the circumferential mass imbalance.

In Embodiment 4, because the continuous conductor wires 40 are installed in every sixth slot of the slots 15a so as to alternately occupy an inner layer and an outer layer in a slot depth direction, the return portions 40a constituting the front-end and rear-end coil end groups 38f and 38r are arranged so as to line up neatly in a circumferential direction. As a result, alignment in rows and increased density in the return portions 40a are enabled, enabling a compact stator 80 to be achieved.

Because the straight portions 40b of the continuous conductor wires 40 are housed so as to line up in single rows in the slot depth direction inside each of the slots 15a, the space factor of the electrical conductors housed in the magnetic circuit of the stator 80 is improved, enabling a high-output stator 80 to be achieved.

Moreover, in Embodiment 4 above, the stator winding 38 is explained as being constructed by connecting the first to sixth winding sub-portions 42 to 47 based on the connection method shown in FIG. 11, but connection of the first to sixth winding sub-portions 42 to 47 is not limited to this method and may be arbitrarily set according to design specifications.

The arrangement of the joint portions in the entail connection portions 37 and the arrangement of the entail connection portions 37 and the lead wires 27 (the output wires and the neutral-point lead wires) are not limited to the arrangements in Embodiment 4 above. In other words, the entail connection portions 37 are formed at the abutted portions (indicated by the numeral 36 in FIG. 10) when the rectangular parallelepiped laminated core is rolled up, but the lead wires 27 (the output wires and the neutral-point lead wires) have a degree of design freedom and may be arbitrarily set according to design specifications.

In Embodiment 4 above, the winding assemblies 50 are explained as being mounted to the stator core 15A so as to be stacked in three layers in a radial direction, but it goes without saying that the winding assemblies 50 may also be mounted to the stator core 15A so as to be stacked in two layers or four or more layers in a radial direction.

In Embodiment 4 above, the first mass adjusting portion 28 is disposed on the rear-end entail connection portion 37, but first mass adjusting portions 28 may also be disposed on apex portions of the rear-end coil end group 38r so as to be positioned on mutually opposite sides of the entail connection portion 37.

In Embodiment 4 above, axial mass imbalances may also be relieved by disposing a second mass adjusting portion 29 on the front-end entail connection portion 37.

In each of the above embodiments, the first and second mass adjusting portions 28 and 29 are explained as being made of a resin, but the first and second mass adjusting portions 28 and 29 are not limited to being made of a resin provided that the mass can be adjusted therewith.

In each of the above embodiments, an automotive alternator has been explained, but the present invention also exhibits similar effects if applied to a dynamoelectric machine such as an alternating-current electric motor, an alternating-current electric motor-generator, etc.

What is claimed is:

1. A stator for a dynamoelectric machine comprising:
an annular stator core in which a large number of slots extending in an axial direction are disposed in a circumferential direction so as to open radially inward;
a stator winding having a plurality of winding phase portions installed in said stator core, lead wires of said plurality of winding phase portions being led axially outward within a predetermined circumferential range from an axial end of a first coil end group formed at a first axial end of said stator core; and
a first mass adjusting portion disposed at a first end of said stator core, said first mass adjusting portion adjusting an imbalance in mass relative to a central axis of said stator core resulting from a circumferential bias in positions from which said lead wires are led out.

2. The stator for a dynamoelectric machine according to claim 1, wherein:

said first mass adjusting portion is disposed on an axial end of said first coil end group.

3. The stator for a dynamoelectric machine according to claim 2, wherein:

said plurality of winding phase portions are constituted by at least one winding assembly formed by simultaneously folding a plurality of continuous conductor wires, said winding assembly is constructed by arranging continuous conductor wire pairs equal in number to a predetermined slot pitch so as to be offset by a pitch of one slot from each other, said continuous conductor wires being formed into a pattern in which straight portions are linked by return portions and arranged at said predetermined slot pitch and adjacent pairs of said straight portions are offset so as to alternately occupy an inner layer and an outer layer in a slot depth direction by said return portions, said continuous conductor wire pairs being formed such that two of said continuous conductor wires are arranged so as to be offset by said predetermined slot pitch from each other with said straight portions superposed, and end portions of said continuous conductor wires extending outward on first and second sides at first and second ends of said winding assembly, said winding phase portions are constructed by connecting said end portions of said continuous conductor wires constituting said winding assembly installed in said stator core projecting outward from said slots at first and second axial ends of said stator core, and said first coil end group is constructed by arranging said return portions into an annular shape in a circumferential direction.

4. The stator for a dynamoelectric machine according to claim 3, wherein:

said first mass adjusting portion is formed on an entail connection portion formed by connecting said end portions of said continuous conductor wires projecting outward from said slots at said first axial end of said stator core.

5. The stator for a dynamoelectric machine according to claim 1, further comprising:

a second mass adjusting portion disposed at a second end of said stator core, said second mass adjusting portion adjusting an imbalance in mass between said first end and said second end of said stator core relative to a plane perpendicular to a central axis of said stator core at an axial center of said central axis.

* * * * *